United States Patent [19]

Wilson

[11] Patent Number: 5,584,905

[45] Date of Patent: Dec. 17, 1996

[54] PREPARATION OF AMENDMENTS AND FERTILIZER PRODUCTS FOR AGRICULTURAL SOILS BY ENTRAPMENT OF ACID GASES BY SOLID WASTE MATERIAL

[76] Inventor: Harold W. Wilson, 6985 Market Ave., El Paso, Tex. 79915

[21] Appl. No.: 367,426

[22] Filed: Dec. 30, 1994

[51] Int. Cl.[6] .................... B01J 8/00; C05C 9/00; C05D 1/00; C05F 9/00

[52] U.S. Cl. ............ 71/14; 71/28; 71/29; 71/30; 71/63; 71/64.13; 71/904; 423/244.07; 423/244.08; 423/244.1

[58] Field of Search .................. 423/210, 239, 423/242, 244, 244.07, 244.08, 244.1; 71/63, 14, 28–30, 904, 64.13

[56] References Cited

U.S. PATENT DOCUMENTS

| | | | |
|---|---|---|---|
| 3,860,409 | 1/1975 | Wilson | 71/62 |
| 3,882,221 | 5/1975 | Wilson | 423/244 |
| 4,176,163 | 11/1979 | Nelson | 423/242 |
| 4,302,236 | 11/1981 | Roman | 71/9 |
| 4,588,568 | 5/1986 | Pollmann et al. | 423/244 |
| 4,818,505 | 4/1989 | Muller | 423/210 |
| 4,915,921 | 4/1990 | Richter et al. | 423/239 |
| 5,129,936 | 7/1992 | Wilson | 71/63 |

OTHER PUBLICATIONS

Soil, The Yearbook of Agriculture, 1957, p. 41 (No Month).
"Diagnosis and Improvement of Saline and Alkali Soils", Agriculture Handbook No. 60, Feb. 1954, pp. 48–49.

*Primary Examiner*—Ferris Lander
*Attorney, Agent, or Firm*—Jacobson, Price, Holman & Stern, PLLC

[57] ABSTRACT

A process for the removal of oxides or hydrated oxides of carbon or sulfur from an acid waste gas stream in which a bed of moist particulated solid waste material is formed, the bed particles are coated with alkaline earth oxides or alkaline earth carbonates and a catalyst to promote the reaction of the oxides or hydrated oxides of carbon or sulfur with the alkaline earth oxides or alkaline earth carbonates in the presence of the moisture and in which the bed is contacted with the waste gas stream whereby the oxides or hydrated oxides or carbon or sulfur react with the alkaline earth oxides or alkaline earth carbonates in the presence of the moisture and are absorbed on the bed particles. The bed particles resulting from the process may be used as agricultural soil amendments alone or in combination with fertilizers and the like.

24 Claims, No Drawings

PREPARATION OF AMENDMENTS AND FERTILIZER PRODUCTS FOR AGRICULTURAL SOILS BY ENTRAPMENT OF ACID GASES BY SOLID WASTE MATERIAL

BACKGROUND OF THE INVENTION

1. Field of the Invention

The present invention relates to the preparation of amendments and fertilizer products for agricultural soils by entrapment of acid gases contained in atmospheric air containing oxides and/or hydrated oxides of carbon and/or sulfur. The acidic gases are entrapped by solid waste material generally referred to as "garbage".

2. Description of the Related Art

Calcium oxide in its various forms is found in many alkaline earth compounds such as calcite, aragonite, dolomite, and limestone as calcium carbonate ($CaCO_3$), burnt lime (CaO), slaked and hydrated lime ($Ca(OH)_2$), and calcium-magnesium carbonate ($CaMgCO_3$). It has been suggested to use calcium oxide in its various forms in the presence of water, usually as a slurry or a watery paste of varying viscosities, to react and combine chemically with sulfur dioxide ($SO_2$) and sulfur trioxide ($SO_3$) gases. These gases are present in acidic gases derived from burning coal and other combustible organic type matter containing sulfur, and from conversion by roasting (oxidation) of sulfide forms of sulfur present in sulfide sulfur types of ores. These sulfur oxide gases are brought into contact with such lime-containing slurries to "trap" the gases, i.e., to cause chemical combination of the sulfur oxide gases with the lime slurries to form slurries containing products of alkaline neutralization wherein the lime (CaO) has reacted with the sulfur oxides to form hydrates of calcium sulfite ($CaSO_3 \cdot xH_2O$) and some calcium sulfate hydrate ($CaSO_4 \cdot xH_2O$). Other approaches for entrapment of acidic gases have involved spraying of "solutions" of various alkaline liquids containing suspensions of lime directly into the acid gases, which are essentially atmospheric gas borne carbon and sulfur oxides, to form neutralized and semi-neutralized calcium carbonates, bicarbonates, sulfites, bisulfites, sulfates, and bisulfate salts of calcium of varying degrees of hydration. Other processes such as disclosed in Wilson U.S. Pat. No. 3,882,221 have used fluid bed reactors where the acid gases are caused to come into contact with alkaline (NaOH) coated particles of acid-undecomposable siliceous matter in the presence of controlled amounts of water. All of these processes essentially rely on applications of chemistry where sulfur oxide gases combine with water to form sulfurous and sulfuric acids which react chemically with alkali and alkaline earth hydrated oxides to form sodium or calcium salts of oxides and hydrated oxides of carbon and sulfur.

SUMMARY OF THE INVENTION

It is an object of the present invention to provide an improved process for trapping acidic gases contained in atmospheric air containing oxides and/or hydrated oxides of carbon and/or sulfur.

It is another object of the present invention to provide a process for trapping acidic gases which is more efficient and less costly when compared with other methods in current use.

It is yet another object of the present invention to provide new, currently unavailable products made by entrapping acidic gases with waste matter which are of practical use and have important economic value.

The improved process of the present invention provides for effective entrapment of acid gases, particularly those gases containing oxides and hydrated oxides of sulfur and carbon, for example, sulfur dioxide ($SO_2$), sulfurous acid ($H_2SO_3$), sulfur trioxide ($SO_3$), sulfuric acid ($H_2SO_4$), carbon dioxide ($CO_2$) and carbonic acid ($H_2CO_3$). In this process, the acid gases are passed through ground, commercial solid waste matter, or through aggregates of ground, household garbage, having some water content and particle surfaces physically coated with alkaline earth oxides and/or alkaline earth carbonates, such as calcium oxide (CaO) and calcium carbonate ($CaCO_3$). The acid gases brought into contact with the garbage waste matter particles react with the alkaline substances present on the surfaces of the particulate waste matter in the presence of moisture and are adsorbed on the surfaces of the alkaline earth-coated garbage particles. Ferrosoferric oxide or some other non-toxic metal catalyst may be added to the garbage which is subjected to milling (grinding and particle subdivision) in an oxygen-containing atmosphere.

When the particulate matter (garbage) is exposed to, for example, acid $SO_2$ containing gas, some portions of it are immediately oxidized to sulfur trioxide. The sulfur trioxide in turn reacts with water and then lime to form hydrated calcium sulfate ($CaSO_4 \cdot 2H_2O$) adsorbed on the cellulose and lignocellulose matter of the garbage.

The products resulting from this process can be employed as soil amendments alone, or the products can be admixed in any desired proportions with agricultural limestone itself as well as with various amounts, as desired, of many other commercial chemical fertilizers. Thus, the products can be used to make unlimited numbers of, and combinations of, chemical fertilizer compounds containing organic matter having soil amendment properties in conjunction with having selected kinds and amounts of primary, secondary, and trace plant nutrients. These products can be used for fertilization and soil amending for treatment of all types of agricultural soils while at the same time providing for disposal of both waste garbage and waste acid gases.

DESCRIPTION OF THE PREFERRED EMBODIMENTS

Solid waste matter can be most usefully employed as a principal ingredient in the process for acid gas entrapment. Commercial solid waste matter may, for example, contain the following materials: approximately 40–50% paper, 8–12% wood, 8–10% food waste, 2–4% textiles, 8–10% plastics, 15–25% yard wastes and a balance 2–4% unidentified extraneous matter such as soil. However, "solid waste matter" as used herein is intended to mean any waste or trash, whether commercial or household, which is commonly referred to as garbage.

The preferred moisture content of the garbage (as chemically uncombined, free water) at the onset of its exposure to acid gas streams is about 30 to 35% by weight $H_2O$. The explanation for this preference rests primarily with the preferred physical state of the garbage at the onset as well as throughout its exposure to streams of acid gas. This range of "moisture" content permits both easy access of the gas streams to the surfaces of the treated garbage while it also permits "fluidity" of the "solid state" matter to allow constant surface exposure for optimum chemical and physical (adsorption and absorption) activity. Since the presence of free water is necessary for the formation of hydrates and all ensuing acid-alkali hydrolytic activity of the organic matter (e.g., cellulose) by the sulfur and alkali oxide hydrates and for the formation of the many additional products of chemical reaction such as oxidation of sulfur dioxide, acid-base neutralizations, catalytic reactions of both the water and the ferrosoferric oxide or other non-toxic metal catalyst, restriction of water availability of necessity would restrict many reactions and may even prevent other reactions from even occurring to the detriment of achieving the maximum potential of the process. This preference for 30 to 35% water content means, simply, that in order to maintain semi-solid matter (the treated garbage) in an optimal "free flowing" state easily penetratable by steams of acid gas whether treatment is made in either fixed or fluid bed systems to maintain maximum surface area contact of the acid gas stream with the "wetted" surfaces of the treated particulate matter (the garbage) the range of 30 to 35% water is required and neither more nor less is acceptable for optimal results. Experiments have shown that the presence of almost any measurable amount of water (as low as 0.5% by weight) permitted acid gas entrapment while, when the free water content exceeded 37% to 40% by weight (or more), the system became "water logged" and the required state of "fluidity" to permit optimum contact of the acid gas stream with surfaces of the treated alkali garbage which could accept and react chemically and physically with the acid gas became almost non-existent. Thus, the broad range of water content could be from less than 1% by weight to 40% by weight, but optimal results are only obtained within the preferred range.

The addition of ferrosoferric oxide or other non-toxic metal catalyst (in a range of 2–10% by weight) to the mixture of garbage, hydrated lime, and water creates a positive catalytic effect which greatly enhances the oxidation rate of the strongly reducing sulfur dioxide gas to primarily form oxidized sulfate sulfur compounds in the treated garbage mixture. Experiments have shown use of the ferrosoferric oxide in the range of approximately 4 to 6% by weight allowed maximum conversion of sulfur dioxide into sulfur trioxide. Other experiments using garbage of different compositions allowed maximum sulfur oxide conversion where only 2 to 3% by weight of the ferrosoferric oxide was present in the garbage mixture. Additional studies showed more rapid conversion but not as great in amounts where inclusion of 8 to 10% by weight of the ferrosoferric oxide was made as when the 2 to 3% by weight was made. Indications showed that particle sizes were also factors, where 90% minus 100 mesh U.S. Standard Sieve particles used in the same percentages as 50% plus 60 mesh and 40% minus 200 mesh gave almost the same amounts of oxide conversions in the same time periods with similar garbage. Overall studies showed the broad and preferred ranges would vary depending upon a number of factors but are within the range of 2 to 10% by weight.

A number of intermediate reactions, many highly complex in nature, take place both during and after the introduction of the sulfur dioxide-containing gas. Some of the observed and measured reactions which occur are:

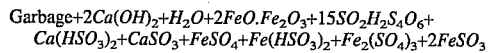

$$Garbage + 2Ca(OH)_2 + H_2O + 2FeO.Fe_2O_3 + 15SO_2H_2S_4O_6 + Ca(HSO_3)_2 + CaSO_3 + FeSO_4 + Fe(HSO_3)_2 + Fe_2(SO_4)_3 + 2FeSO_3$$

When the reaction takes place by passing a constant stream of acidic $SO_2$ gas through a fixed bed of garbage, some of the products of initial reaction in the entry part of the bed are later exposed to additional $SO_2$-containing gas which results in varying degrees of conversion of the initially formed insoluble sulfite salts into soluble bisulfite sulfur compounds. When garbage is treated with sulfur dioxide gas in moving or fluid beds, varying mixtures of acid sulfite, bisulfite, and hydrated sulfite and sulfate compounds tend to be produced where some of the initial products become changed into different products of varying degrees of hydration. Some of the reactions that have been observed to take place are shown below:

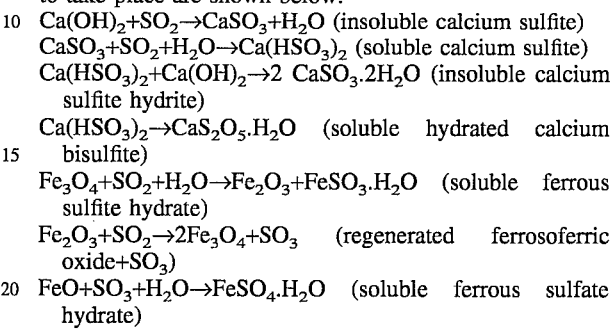

$Ca(OH)_2 + SO_2 \rightarrow CaSO_3 + H_2O$ (insoluble calcium sulfite)
$CaSO_3 + SO_2 + H_2O \rightarrow Ca(HSO_3)_2$ (soluble calcium sulfite)
$Ca(HSO_3)_2 + Ca(OH)_2 \rightarrow 2\ CaSO_3.2H_2O$ (insoluble calcium sulfite hydrite)
$Ca(HSO_3)_2 \rightarrow CaS_2O_5.H_2O$ (soluble hydrated calcium bisulfite)
$Fe_3O_4 + SO_2 + H_2O \rightarrow Fe_2O_3 + FeSO_3.H_2O$ (soluble ferrous sulfite hydrate)
$Fe_2O_3 + SO_2 \rightarrow 2Fe_3O_4 + SO_3$ (regenerated ferrosoferric oxide+$SO_3$)
$FeO + SO_3 + H_2O \rightarrow FeSO_4.H_2O$ (soluble ferrous sulfate hydrate)

Little difference is observed between use of the various resultant products when incorporated into agricultural soils. In other words, the soil appears to respond, in general, more or less the same compared with other sulfur soil amendments currently in use insofar as their chemical form and content of sulfur are concerned. These various other sulfur soil amendments include elemental sulfur and sulfur compounds having various degrees of atmospheric and soil oxidation including sulfide sulfur and sulfate sulfur. Likewise, whether the products are formed by using fixed or fluid-bed $SO_2$ gas entrapment processes, their soil amendment properties appear to be quite similar as well as similar to like $SO_2$-containing calcium and lignocellulose compositions of matter. However, these products are far superior in comparison with sulfur compounds without lignocellulose-containing garbage.

Studies have shown that incorporation of varying amounts (typically 2–25% by weight) of readily available, finely ground mineral, Wollastonite—calcium silicate ($CaSiO_3$), in the organic matter such as garbage improves the entrapping of sulfur dioxide and other gaseous matter such as carbonaceous substances and carbon dioxide which may be present in acid gases. Calcium silicate ($CaSiO_3$) is well known for its large absorption capacities (e.g., 600% for water) as well as for its tremendous adsorptive capabilities since its available reactable surface area is in the range of 95–175 $M^2/gram$. This substance remains as a free-flowing solid powder after absorbing as much as one to one and one-half times its own weight of liquids containing sulfurous acid as $H_2SO_3$.

The present invention produces products which are useful as soil amendments and the like but which would otherwise be considered as waste and mostly disposed of by being incorporated into landfills. More specifically, the products produced by the present invention have been found to be highly suitable and fully applicable to agricultural soils for soil beneficiation while at the same time providing plant nutrients, especially calcium and sulfur along with organic matter containing usable amounts of nitrogen phosphorous for enhancement of soil fertility nutritional status, and crop yields. Thus, the present invention results in reduction of landfill requirements since the products of the invention can be used as combinations of soil amendments and chemical fertilizers rather than being disposed of as useless wastes. At the same time, with use of this invention, a large group of presently unavailable and valuable, highly beneficial agricultural products become available from the resulting useful consumption of the combination of waste garbage and waste acid gases.

The use of various soil amendments (known as chemical amendments) including gypsum ($CaSO_4.2H_2O$), elemental sulfur (S), iron sulfate ($FeSO_4$) and limestone ($CaCO_3$) have been described in detail in the Agricultural Handbook No. 60, "Diagnosis and Improvement of Saline and Alkali Soils" U.S D.A February 1954, pages 48–49, and have been successfully employed as soil amendments for at least forty years. The products which can be produced from use of the present invention can be used as some or all of these amendments.

Ferrosoferric oxide ($Fe_3O_4$) or some other non-toxic metal catalyst may be used to bring about positive catalytic oxidation of the forms of sulfur which are present in the acid gas being passed through the garbage. Additionally, the presence of adsorbed atmospheric air on the ground garbage allows the oxygen of the atmospheric gas to oxidize other portions of the adsorbed, strongly reducing sulfur dioxide gas. The pertinent reactions are as follows:

$$SO_2 + 4FeO \rightarrow 2Fe_2O_3 + S$$

$$SO_2 + 3Fe_2O_3 \rightarrow 2Fe_3O_4 + SO_3$$

$$SO_3 + CaO \rightarrow CaSO_4$$

One of the most valuable entities present in the garbage mixture is the garbage itself with its myriad contents of polysaccharides including compounds such as lignocellulose, cellulose, and many other carbohydrates all admixed in the presence of nitrogen-containing proteinaceous matter, fatty acid compounds, and a very wide assortment of many other organic chemicals such as, to name only a few, alcohols, amines, ketones, aldehydes, and esters. This mixture of organic chemicals readily lends itself to a multitude of both acid and alkaline hydrolytic reactions as well as to numerous other types of both chemical and physical reactions including neutralization, sulfonation, decomposition, alcoholysis, ammoniation, oxidation and reduction, nitrification, esterification, and degradation to name only a few. Due to the large number of potential chemical and physical reactivities of the hydrated cellulose and lignocellulose of the garbage in the presence of other reactive matter, coupled with the variations of amounts of hydrates of calcium oxide compounds present on the tremendous surface areas available, it is impossible to define all the reactions that take place under the variable chemical and physical conditions involved (such as those concerned with organic chemistry in general, physical chemistry, and colloid chemistry). This is particularly true after such alkaline treated organic matter (garbage) is exposed to treatment with the hydrolyzed sulfur oxides such as sulfurous acid ($H_2SO_3$) and sulfuric acid ($H_2SO_4$) along with carbonic acid ($H_2CO_3$), all of which are contained in acid gases in various concentrations vented from the combustion of sulfur-containing organic matter of coal and petroleum source fuels, and from oxidation heat processing as employed in the metallurgical treatment of sulfur-containing ores.

Although it is not possible to define all of the reactions taking place, all of the products made with this invention, as varied as they can be in composition, are generally suitable for application to agricultural soils if for no other use than for soil beneficiation and for the improvement of water penetration and water retention of such treated soils. As one example of possible product variation, when garbage is treated with acid gases from combustion of sulfur-containing, high ash content, pulverized coal, its large content of siliceous matter reacts with the hydrated lime present on the surface particles of the garbage in the presence of water vapor to produce a semi-cementicious type of colloid matter. After being exposed to acidification with acid gas containing hydrolyzed sulfur oxides (including sulfurous acid), the product was determined to be a hydrolyzed silicate of calcium ($CaSiO_3.X\ H_2O$) combined with a mixture of hydrated calcium acid sulfite and calcium acid sulfate ($CaHSO_3.CaHSO_4$) adsorbed mainly by the cellulose-lignocellulose matter of the garbage. This particular example demonstrates that the fly ash present with the gases obtained from combustion of high-ash content coal has defined pozzolithic properties and by use of this invention such fly ash can be usefully disposed of as a component of soil amending products to permit reincorporation of matter (fly ash) into the soil from which it basically originated. If the coal combusted had contents of calcite ($CaCO_3$) and/or pyrite ($FeS_2$), the fly ash will also have contents of sulfate sulfur ($SO_3$), iron oxide ($Fe_2O_3$), and phosphorus (P).

Because of the proteinaceous matter found in garbage (in protein-containing food wastes), along with organic fatty acids, protein, and ammoniacal nitrogen, another group of chemical reactions occur. For example, when proteinaceous matter is hydrolyzed in the presence of carbon dioxide (as is present in calcium carbonate ($CaCO_3$)), the ammonia formed reacts with the carbon dioxide to form ammonium carbamate ($2NH_3+CO_2\rightarrow H_4NCO_2NH_2$) after which the ammonium carbamate is hydrolyzed by water to form ammonium carbonate (($NH_4)_2CO_3$) which in turn reacts with lime (CaO) to release ammonia and form calcium carbonate as follows: $(NH_4)_2CO_3+CaO\rightarrow CaCO_32+NH_3+H_2O$. In turn, the released ammonia ($NH_3$) is able to react with sulfur dioxide ($SO_2$) to form ammonium amide sulfite ($2NH_3+SO_2\rightarrow NH_2SO_2.NH_4$) while the amino acids of the proteinaceous matter are decarboxylated in the presence of hydrated lime ($Ca(OH)_2$) to form amines and release carbon dioxide $CO_2$ ($RCHNH_2+Ca(OH)_2\rightarrow RCH_2NH_2+CaO+H_2O+CO_2$), all of which works together to convert the proteinaceous nitrogen present in the garbage into usable forms of ammoniacal and urea nitrogen for plant nutrition. Additionally, fatty acids present in the garbage such as the acids contained in meat can react with the ammonia made available ($C_{17}H_{35}COOH$ (stearic acid)$+NH_3\rightarrow C_{17}H_{35}COONH_2$ (ammonium stearate)) thus preventing the loss of reactable ammonia, while any urea produced from contact of carbon dioxide with ammonia ($CO_2+2NH_3\rightarrow H_2NCONH_2$ (urea)$+H_2O$) assures protection of ammonia from loss. In the event that carbon monoxide (CO) is part of the acid gas being introduced into the garbage, the ammonia will combine with the carbon monoxide to form ammonium cyanate ($NH_4OCN$) which in turn rearranges to form urea ($H_2NCONH_2$) which has well known usage for nitrifying agricultural soils with plant-available nitrogen.

One of the primary advantages of the products produced by treatment of garbage wastes in accordance with the invention lies in their potential when added to agricultural soils to become soil organic matter whose most observed and principal effect on soil reaction rests in the ability to increase the buffer capacity of such treated soils It is noted in the "Soil", The Yearbook of Agriculture 1957, p. 41, that a soil rich in decomposing organic matter provides a much higher level of carbon dioxide in the air above the treated soil than does a barren, infertile soil lacking such organic matter. Thus, soil management can affect photosynthesis in plants. Like soil clays, colloidal particles of organic matter in the organic fraction of soils are negatively charged and attract positively charged ions to their surfaces. On the basis of unit weight, the retentive capacity of organic matter is greater than that of the most reactive clays, thus the importance of the organic matter present in soils is far beyond the weight percent present. Further, most of the energy needed to keep the soil population functioning and to drive the myriad of soil processes comes from the conversion of organic matter as carbon into carbon dioxide. A long continuing decomposition of the organic matter constituents present in the processed garbage of this invention, along with the available carbon dioxide ($CO_2$) when the lime source is calcium carbonate ($CaCO_3$), assures soils treated with the products made by this invention of a long, continual supply of organic carbon.

In the event carbon to nitrogen ratios show a need for increased amounts of available nitrogen in soil, products of this invention can be admixed with requisite amounts of urea, ammonium sulfate, or similar nitrogen-containing chemical fertilizers for addition to soils showing an available nitrogen deficiency. In the event that introduction of these calcium-containing products into a soil system (especially acidic type soils) offsets potassium availability, compounds such as potassium nitrate and potassium sulfate can be introduced in requisite amounts into the limed garbage during processing, or, if desired, such potassium-containing compounds can be admixed in the requisite amounts with products made by the process of the invention for application to treated soils showing signs of potassium reduction. Use of potassium nitrate in the garbage mixture will also provide nitrogen in addition to potassium while enhancing oxidative conversion of sulfur dioxide into sulfur trioxide. Additionally, so-called chemical fertilizer compounds (plant foods) for the most part can be physically introduced into the sulfur dioxide acid gas treated, limed garbage products in amounts such that the treated garbage products are made to contain defined amounts of available nitrogen, available phosphorous pentoxide, and soluble potash. For example, rock phosphate or other known agricultural chemical derivatives such as super- and triple- super-phosphates can be admixed in desired amounts with garbage mixtures to result in products of known composition and amounts of available phosphate in the resultant garbage products. If equal parts of the garbage product is admixed with triple superphosphate, the resultant product would contain 23% of available $P_2O_5$ which would have the designation of plant food content, 0-23-0, which, in addition, would contain nitrogen, potassium, calcium, sulfur, trace plant nutrients all in addition to its contents of organic matter. If urea is used in place of the triple super-phosphate in equal amounts (by weight) of the garbage product of this invention, the resultant product would have a designated plant food content of 23-0-0. A large number of chemical plant food end-products with the designated contents, $N-P_2O_5-K_2O$ containing large quantities of organic matter can thus be produced using the invention.

The following non-limitative examples further illustrate the present invention:

EXAMPLE 1

Four hundred forty (440) grams of dry, ground garbage from which prior to milling all magnetic metals (2.2%), aluminum metal (1.2%) and glass (3.2%) were removed to leave the following composition-of-matter: a composite of ground material represented by paper and cardboard—47.6%; yard waste—25.4%; food waste—10.1%; wood—6.1%; textiles—3.1%; plastics—5.1%; rubber and leather—1.2%; and miscellaneous other materials—1.4%. To the 440 gram batch of garbage was added 280 milliliters of water, 140 grams of hydrated lime ($Ca(OH)_2$), and 20 grams of ferrosoferric oxide ($Fe_3O_4$) to give a total resultant weight of thoroughly mixed, free-flowing solid composition-of-matter of 880 grams having an uncombined (free) water content in the range of 30–35%. This mixture was transferred to a 10 inch diameter by 30 inch length plastic tube which was stoppered at each end with rubber stoppers each fitted with glass and rubber tubing to allow a controlled rate of entry at the lower end of sulfur dioxide gas admixed with air and an exit from the upper end of the tube. Sulfur dioxide gas-air mixture was drawn through the fixed bed of prepared garbage mixture by vacuum displacement. The gas drawn from the exit end of the plastic tube was made to pass into and through liquid in a flask. The liquid consisted of a known quantity of dissolved iodine and potassium iodide, which type solution is well known and commonly employed to stoichiometrically form sulfite sulfur ($SO_2^=$). Sulfur dioxide gas was drawn by suction vacuum through the garbage mixture until the iodine "test" solution was nearly decolorized by the sulfur dioxide gas. A few drops of starch indicator solution introduced into the iodine solution verified that the garbage mixture was unable to trap any further amount of the sulfur dioxide beyond that amount with which it had already reacted. The garbage mixture was removed from the plastic tube, dried, and weighed. A weight gain of 78 grams was found (600 gram weight before exposure to the gas and a weight of 678 grams after exposure to the gas). Examination of the processed, dried, and weighed garbage mixture containing the sulfur dioxide gas verified the presence of sulfur compounds as calcium sulfite ($CaSO_3$), calcium bisulfite ($CaS_2O_5$), and calcium sulfate hemihydrate ($CaSO_4 \cdot H_2O$) in a ratio of 1:1:4 approximately as the sulfite, the bisulfite, and the sulfate salts of calcium. Quantitative determinations for content of total sulfite sulfur as $SO_2$ showed the product contained the equivalent of 11.44% combined sulfur dioxide.

EXAMPLE 2

A 500 gram lot of finely mascerated garbage having a 12% by weight content of free water was intimately combined with 150 grams of precipitated, powdered chalk ($CaCO_3$ having a content of 88% Ca), 20 grams of finely ground ferrosoferric oxide ($Fe_3O_4$), and 220 milliliters of ordinary water (tap). This free-flowing, solid mixture was placed into a fluid bed reactor into which was bled 100 grams of sulfur dioxide gas (99+% $SO_2$ gas) diluted with an equal volume of atmospheric air while the garbage mixture was in full state of fluid movement. The resultant product, after being air dried at 250° F., weighed 710 grams. Analysis of a representative portion of this product showed its sulfur dioxide content was 13.8–14.0% by weight and the combined calcium and sulfur compounds present in the product consisted of calcium sulfite dihydrate ($Ca(SO_3)_2 \cdot H_2O$), calcium bisulfite ($CaS_2O_5$), and calcium sulfate dihydrate ($CaSO_4 \cdot 2H_2O$) in a ratio of 1:2:7 parts by weight. Two hundred fifty (250) grams of triple super-phosphate and 260 grams of urea were added to and thoroughly mixed with 490 grams of this garbage product to give 1000 grams of a conventional agricultural fertilizer designated as formula 12-12-1 which contained approximately 12% nitrogen, 12% available $P_2O_5$, and 1% potash ($K_2O$) in addition to its contents of approximately 49% organic matter plus the presence of calcium, iron, and sulfur chemical compounds.

It should not be construed from the above examples that greater or lesser amounts of sulfur dioxide cannot be trapped than are shown. Stoichiometrically, the amounts of available calcium oxide or its equivalent present in the garbage mixture employed will be directly related to the amounts of sulfur dioxide that can be neutralized by the alkaline calcium oxide (or its equivalent) in the presence of water as shown below:

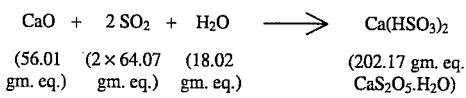

$$CaO + 2SO_2 + H_2O \longrightarrow Ca(HSO_3)_2$$
(56.01 gm. eq.) (2×64.07 gm. eq.) (18.02 gm. eq.) (202.17 gm. eq. $CaS_2O_5 \cdot H_2O$)

This, of course, is dependent upon the weight content of the sulfur dioxide present in the waste gas stream being processed (and any other contributors to the acidity of such waste gas stream being treated), as well as the amounts of gas being passed into the garbage mixture during a specific time period. This will define the amount of sulfur containing compounds present in specific amounts in the end product.

As should be apparent from the above discussion, (1) the parameters of both the alkali and the acid will primarily be functions of the amount and degree of acidity present in various gas streams in comparison with the amount of alkaline oxide and/or carbonate made available for being contacted by the acids in the acid-gas streams, and (2) the presence of sufficient free (chemically uncombined) water in order that (a) complete hydrolysis of the alkali is able to occur to produce the alkali hydrates ($CaO \cdot H_2O \rightarrow Ca(OH)_2$), and (b) complete hydrolysis of the acid gases occurs to produce acid hydrates ($SO_2 \cdot (OH_2)$ and $SO_3 \cdot (OH_2)$), and (c) part of the water present is free to act as a positive catalyst to effect the formation of hydrates during which period the unstable hydrated acid ($SO_2 \cdot (OH_2)$) is converted to the stable hydrated acid ($SO_3 \cdot (OH_2)$) as shown below:

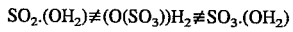

$$SO_2 \cdot (OH_2) \neq (O(SO_3))H_2 \neq SO_3 \cdot (OH_2)$$

all of which, in turn, is followed by the production of successive degrees of hydration of the resultant hydrated alkali and sulfur salts of the alkaline earth compounds ($CaSO_3 \cdot xH_2O$ and $CaSO_4 \cdot xH_2O$) from ½ mol of water to up to 2 mols of water where x above defines an ever increasing variation of amounts of water of hydration from this mechanism of hydration.

Most especially, the present invention seeks to utilize maximum amounts of both garbage and the acid contents of acid gas streams. Thus, a mixture of 99% alkaline substance and 1% of garbage could be described as being able to produce a different end product from acid gas exposure than the products made either from gas treatment of alkaline matter with no contents of garbage or alkaline content of 1% mixed with garbage to result in a mixture of 99% garbage. Thus, the above examples should not be construed as limitative, but only representative, of the present invention which is defined in the appended claims.

I claim:

1. A process for the removal of oxides or hydrated oxides of carbon or sulfur from an acid waste gas stream containing same comprising the steps of:

(a) forming a bed of moist particulated solid waste material;

(b) coating the surfaces of the bed particles with alkaline earth oxides or alkaline earth carbonates;

(c) coating the surfaces of the bed particles with a non-toxic metal catalyst to promote the reaction of the oxides or hydrated oxides of carbon or sulfur with the alkaline earth oxides or alkaline earth carbonates in the presence of the moisture; and (d) contacting the bed particles with the waste gas stream whereby the oxides or hydrated oxides of carbon or sulfur react with the alkaline earth oxides or alkaline earth carbonates in the presence of the moisture and are absorbed on the bed particles.

2. The process of claim 1 wherein the oxides or hydrated oxides of carbon or sulfur are selected from the group consisting of sulfur dioxide, sulfurous acid, sulfur trioxide, sulfuric acid, carbon dioxide or carbonic acid.

3. The process of claim 1 wherein the acid waste gas stream is derived from burning coal.

4. The process of claim 1 wherein the acid waste gas stream is derived from conversion by roasting of sulfide forms of sulfur present in sulfide sulfur types or ores.

5. The process of claim 1 wherein the solid waste material is commercial garbage.

6. The process of claim 1 wherein the moisture content of the particulated solid waste material is about 1 to 40% by weight.

7. The process of claim 1 wherein the moisture content of the particulated solid waste material is about 30–35% by weight.

8. The process of claim 1 wherein the alkaline earth oxides or alkaline earth carbonates are selected from the group consisting of calcium oxide, calcium carbonate, slaked or hydrated lime or calcium-magnesium carbonate.

9. The process of claim 1 wherein the non-toxic metal catalyst is ferrosoferric oxide.

10. The process of claim 9 wherein the ferrosoferric oxide is present in the bed particles in an amount of about 2 to 10% by weight.

11. The process of claim 1 in which the bed of moist particulated solid waste material is a fixed bed.

12. The process of claim 1 in which the bed of moist particulated solid waste material is a fluid bed.

13. The process of claim 1 in which the solid waste material is particulated by grinding in an oxygen-containing atmosphere.

14. The process of claim 1 in which calcium silicate also is coated on the surfaces of the bed particles.

15. An agricultural soil amendment product comprising the bed particles resulting from the process of claim 1.

16. The agricultural soil amendment product of claim 15 further comprising a nitrogen-containing chemical fertilizer.

17. The agricultural soil amendment product of claim 16 wherein the nitrogen-containing chemical fertilizer is urea or ammonium sulfate.

18. The agricultural soil amendment product of claim 16 further comprising a potassium-containing compound.

19. The agricultural soil amendment product of claim 18 wherein the potassium-containing compound is potassium nitrate or potassium sulfate.

20. The agricultural soil amendment product of claim 16 further comprising a source of phosphorus.

21. The agricultural soil amendment product of claim 20 in which the source of phosphorus is selected from the group consisting of phosphorus pentoxide, soluble pot ash, rock phosphate, or super- or triple- super-phosphate.

22. A process for the removal of oxides or hydrated oxides of carbon or sulfur from an acid waste gas stream containing same comprising the steps of:

(a) forming a bed of particulated solid waste material;

(b) adding water to the bed of particulated solid waste material in the amount of about 30–35% by weight;

(c) coating the surfaces of the bed particles with alkaline earth oxides or alkaline earth carbonates;

(d) coating the surfaces of the bed particles with ferrosoferric oxide catalyst to promote the reaction of the oxides or hydrated oxides of carbon or sulfur with the alkaline earth oxides or alkaline earth carbonates in the presence of the water; and (e) contacting the bed particles with the waste gas stream whereby the oxides or hydrated oxides of carbon or sulfur react with the alkaline earth oxides or alkaline earth carbonates in the presence of the water and are absorbed on the bed particles.

23. An agricultural soil amendment product comprising the bed particles produced by the process of claim 22.

24. A process for the removal of oxides or hydrated oxides of carbon or sulfur from an acid waste gas stream containing same comprising the steps of:

(a) forming a bed of moist particulated solid waste material;

(b) coating the surfaces of the bed particles with alkaline earth oxides or alkaline earth carbonates; and (c) contacting the bed particles with the waste gas stream whereby the oxides or hydrated oxides of carbon or sulfur react with the alkaline earth oxides or alkaline earth carbonates in the presence of the moisture and are absorbed on the bed particles.

* * * * *